PIPE JOINT

Original Filed March 31, 1967 3 Sheets-Sheet 1

INVENTOR
Frank. P. Valenziano
BY Wilfred J. Baranick
ATTORNEY

PIPE JOINT

Original Filed March 31, 1967 3 Sheets-Sheet 2

INVENTOR
Frank P. Valenziano
BY Wilfred J. Baranick
ATTORNEY

United States Patent Office

Re. 27,342
Reissued Apr. 25, 1972

27,342
PIPE JOINT

Frank P. Valenziano, Summit, N.J., assignor to Interpace Corporation, Wheaton, N.J.

Original No. 3,432,176, dated Mar. 11, 1969, Ser. No. 652,355, Mar. 31, 1967, which is a continuation-in-part of Ser. No. 411,893, Nov. 17, 1964. Application for reissue Nov. 3, 1970, Ser. No. 86,508
Int. Cl. F16j *15/00, 9/00;* F16k *41/00*
U.S. Cl. 277—168 12 Claims

Matter enclosed in heavy brackets [ ] appears in the original patent but forms no part of this reissue specification; matter printed in italics indicates the additions made by reissue.

ABSTRACT OF THE DISCLOSURE

A push-on joint for bell and spigot pipe having a wedge shaped resilient gasket, stretched over, and abutted against a bearing surface on the spigot end of one pipe, the wedge shaped portion of the gasket centering the spigot in the bell opening of an abutting pipe when the spigot is inserted and pushed into the bell.

This application is a continuation-in-part of application Ser. No. 411,893, filed Nov. 17, 1964, and now abandoned.

This invention relates to pipe joints and, more particularly, to joints between pipe ends wherein the end of one pipe is inserted and pushed into the enlarged end of an abutting pipe with the joint between the pipes sealed by a gasket.

The instant invention is particularly concerned with pipes generally referred to as "bell and spigot." Such pipes have an enlarged end opening, or bell, at one end and a spigot at the other end and are laid, usually in a trench, with the spigot end of one pipe inserted into the bell end of the abutting pipe. A suitable gasket, of resilient material, is provided between the bell and spigot to allow limited deflection of the pipes, at the joints, and to form a liquid-tight seal. The gasket is usually deformed, from its normal cross sectional shape, when engaged between the bell and spigot as the spigot is pushed into the bell. The joint thus formed is generally referred to as a "push on" joint.

The pipe sections may be of cast iron, steel, concrete, cement-asbestos, or of any material suitable for the material to be conveyed, and may be laid, end-to-end, to form a pipe line extending for hundreds of feet and even miles. The pipe sections may be laid in a straight line or may be deflected at the joints to follow the contour of the ground or an intended limited change in direction of the pipe line.

The pipe line is laid continuously. The spigot end of the first pipe is connected by, an elbow, T, or suitable coupling to an existing pipe line, tank, supply, or storage area from which, or to which, liquid, through the line being laid, is to be supplied. The second pipe section is then brought into position, either manually or by mechanical equipment, with the spigot end of the second pipe at the bell end of the first pipe. The spigot of the second pipe is then inserted into the bell end of the first and the spigot is pushed into the bell, telescoping the spigot into the bell. As the spigot is pushed into the bell, the gasket is deformed, or compressed, between the bell and spigot to form a liquid tight joint. Additional pipes are added, section-by-section, in like manner until the line is completed.

After the pipe is laid, it is usual practice, in many installations, to pressure check the line, either after the full line is installed or, in sections, during installations. If, during such pressure check, a particular joint, or joints, are found that leak, the leaking joint is corrected. Depending upon the location of the leaking joints, and because of the telescoping, end-to-end, arrangement of the bells and spigots, a number of sections of pipe may have to be removed to correct the leaking joint. Leaks usually occur because of improper make-up of the joint.

Improper make-up of the joint may be caused by a variety of reasons. The most common reason, however, is because of mis-alignment of the gasket between the spigot and the bell and the failure of the gasket to deflect or deform in the intended manner. The spigot, as it is inserted and pushed into the bell, may displace, roll, or otherwise move, the gasket out of position. Thus, the improperly made-up joint must be disassembled and properly reassembled.

Various joint arrangements have heretofore been used. Some of these include grooves on the spigot, or in the bell, that are expensive to form, or to machine, onto the pipe during manufacture, are easily damaged during handling of the pipe and can become clogged, or filled with dirt, before the pipe is laid. Others require careful alignment of the spigot, with the bell, before the spigot is inserted and pushed into the bell, to prevent gasket misalignment and improper make-up of the joint. Alignment of the spigot with the bell is, of course, difficult in a narrow trench, with manual labor or, in the instance of heavier pipe, with mechanical equipment.

The joint of the instant invention overcomes many of the aforementioned problems. Grooves that can become damaged, or clogged, before installation of the pipe are eliminated. A part of the gasket, as the spigot is inserted and pushed into the bell, aligns the spigot with the bell and, as the spigot is pushed further into the bell and the gasket is compressed, centers the spigot in the bell. The initial alignment of the spigot with the bell by the gasket is an important feature of the instant invention because it substantially reduces manual, or mechanical, alignment and better assures proper make-up of the joint thus, the pipe sections can be laid at a faster rate, with less labor and with properly made-up joints.

It is a principal object of the present invention to provide a pipe joint comprising bell and spigot end portions and an intermediate gasket which may be economically fabricated and easily assembled with assurance that a tight seal will be obtained.

A further object is to provide a bell and spigot pipe joint wherein the configuration of the gasket cooperates with that of the pipe ends to facilitate centering of the spigot within the bell during assembly and virtually eliminates the possibility of rolling or looping of the gasket.

Still another object is to provide a bell and spigot pipe end and gasket construction which permits a shorter joint depth, or pipe overlap, thus resulting in a greater laid length for the same manufactured length, while assuring a tight and effective seal.

A still further object is the provision of a pipe gasket having a generally triangular or wedge-shaped cross-section for cooperation with bell and spigot pipe ends, useful with a wide variety of both pipe and gasket materials, to provide a sealed joint which is simple and economical, yet effective at relatively high operating pressure.

Other objects of the invention will in part be obvious and will in part appear hereinafter.

For a fuller understanding of the nature and objects of the invention, reference should be had to the following detailed description taken in connection with the accompanying drawings wherein.

The gasket of the instant invention is positioned on the spigot end of the pipe before the spigot is inserted into the bell. To retain the gasket on the spigot, the gasket, initially, has a somewhat smaller diameter than the spigot end over which it is subsequently placed. Thus, the gasket is stretched from its normal dimensions, thereby reducing somewhat the cross-sectional area, when placed on the spigot. It will, therefore, be understood that in the following discussion the term "unstretched" applies to the cross-sectional area, shape, etc., of the gasket in its normal configuration, before being positioned on the spigot. Likewise, the term "stretched" applied to the cross section of the gasket after positioning on the spigot before the pipe sections have been brought together to form the joint, thus compressing the gasket therebetween.

Figure 1:
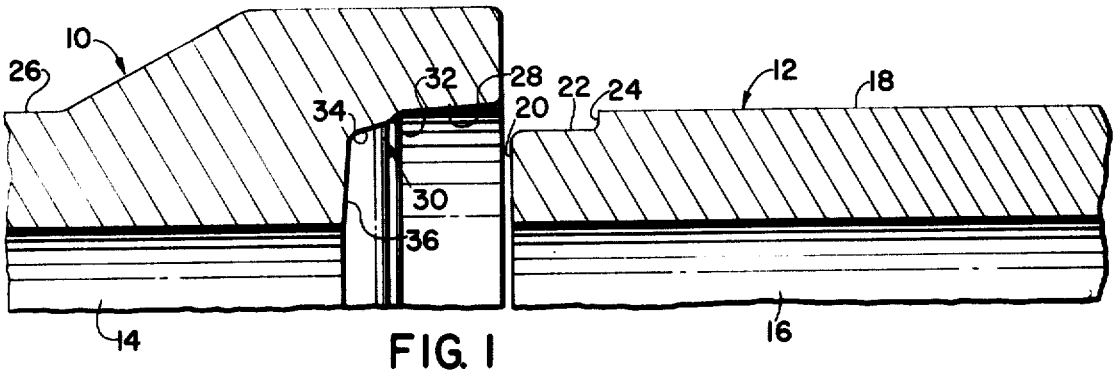
FIG. 1 is a fragmentary, side elevational view in axial cross section of pipe sections having cooperative bell and spigot ends for forming a joint according to the present invention.

Referring now to the drawings, in FIGURE 1 is shown a fragment of pipe section, denoted generally by the reference numeral 10, having a ball end, and a fragment of pipe section 12 having a spigot end. Sections 10 and 12 include internal, major or working surfaces 14 and 16, respectively, of conventional construction. Pipe section 12 includes outer surface 18 and the spigot end section having face portion 20 and a shoulder comprising surface 22, generally concentric with, but of smaller diameter than outer surface 18, and stepped bearing surface 24, lying in a plane substantially normal to the major pipe axis. Both the inner and outer surfaces of both pipe sections are assumed, for simplicity, to be generally cylindrical in shape, but it will be understood that other constructions are possible.

Pipe section 10 includes outer surface 26, which, of course, is of the same diameter as outer surface 18 of section 12 since the sections are identical and surface 18 terminates in a bell opening at the opposite end of section 12. The bell end shown on pipe section 10 includes inner surface 28, substantially concentric with and slightly larger in diameter than outer surface 18 so that the spigot may be inserted in the bell end. For purposes of casting, surface 28 may be slightly tapered, for example 2°, to allow for easy break-away and removal of the casting core. Shoulder 30 of the bell end is designed to oppose the adjoining spigot end when the pipe sections are brought together. Surface 32 of shoulder 30 is preferably disposed at a slight angle to a plane normal to the major pipe axis, and surface 34 is likewise at a slight angle to the pipe axis. It is also possible to construct the ininterior of the bell end without shoulder 30 by continuing suface 28 to surface 36 (see FIGS. 8 and 9). Face portion of 36 of pipe section 10 opposes face portion 20 of section 12 when the sections are joined, but is preferably spaced a short distance therefrom, as shown in subsequent FIGURES, to allow for manufacturing tolerances in both pipe sections and gaskets as well as for shifting of the relative positions of the pipe sections during and after joining.

Figure 2:
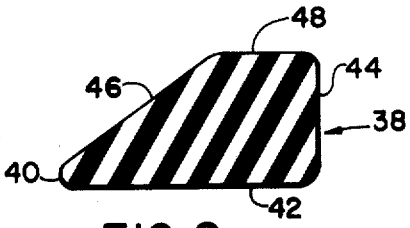
FIG. 2 is a cross section of one embodiment of a gasket intended to be used with the pipe sections of FIG. 1 in forming the aforesaid joint.
Figure 3:
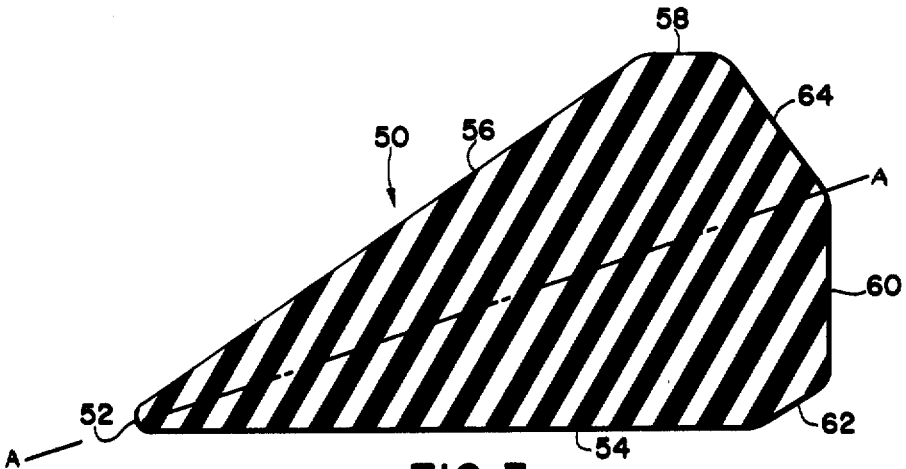
FIG. 3 is a cross section of a second gasket embodiment.

In FIGS. 2 and 3 are shown cross sections of preferred gasket configurations for use with the bell and spigot pipe ends of FIG. 1. Both embodiments may be seen to have a generally triangular or wedge-shaped cross section, and may be fabricated of any conventional material previously used for such purpose, such as natural rubber, neoprene, butyl and nitrile, for example. The FIG. 2 gasket, generally designated by the reference number 38, includes toe portion 40 and surfaces 42, 44, 46 and 48. Surface 42 comprises the inner face of the gasket and is in contact with surface 22 of the spigot when the gasket is in use. Surface 44 of gasket 38 is disposed substantially at 90° to surface 42 and is positioned in contact with surface 24 of the spigot shoulder. Gasket surface 46 meets at toe portion 40 with surface 42 and is disposed at an angle thereto and, therefore, at an angle with respect to the pipe axis when positioned on the spigot. Surface 48 is generally parallel, or concentric, with surface 42 and preferably less than half as wide as the latter.

The gasket of FIG. 3, generally designated by the numeral 50, is somewhat similar in configuration to gasket 38, having also a toe portion 52, inner face surface 54, and surface 56 disposed at an angle thereto. Also, surface 58 is provided substantially concentric with surface 54, as in the case of surfaces 42 and 48. However, in addition to surface 60, which is at 90° to surface 54, gasket 50 includes surfaces 62 and 64. Surface 64 is of the same width as surface 60 and so disposed with respect thereto that line A—A, which bisects the angle at toe portion 52 between surfaces 54 and 56, also bisects the angle between surfaces 60 and 64. Surfaces 58 and 62 are of equal width and disposed at equal angles with respect to surfaces 64 and 60, respectively. Thus, it may be seen that gasket 50 is symmetrical on each side of line A—A, and may be installed with either surface 54 or surface 56 in contact with spigot surface 22.

Figure 4:
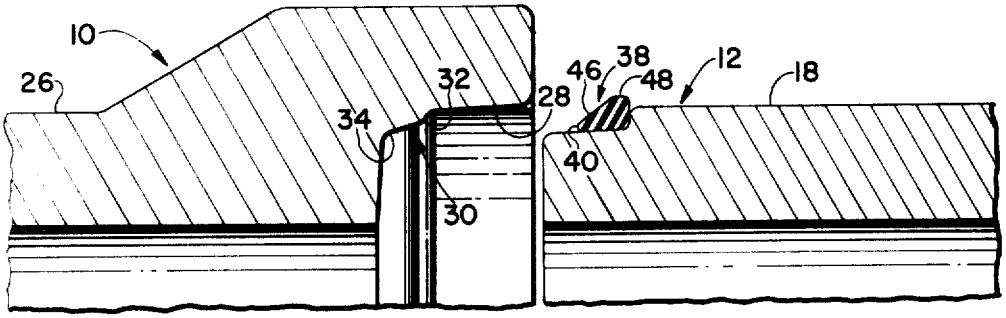
FIG. 4 shows the gasket of FIG. 2 stretched over the spigot end of the pipe section of FIG. 1.
Figure 5:
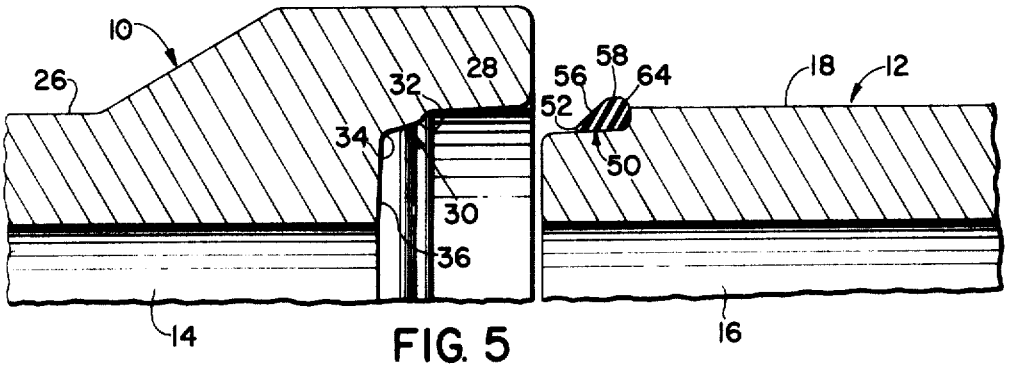
FIG. 5 shows the gasket of FIG. 3 on the spigot.

FIGS. 4 and 5 show the gaskets of FIGS. 2 and 3, respectively, stretched over the spigot end of pipe section 12 preparatory to joining the two pipe sections together. It will be noted that in the illustrated embodiments the stretched height of the gaskets is approximately twice the height of the spigot shoulder. In other words, the height of spigot bearing surface 24 is about one-half the stretched height of surface 44 of gasket 38; gasket 50, when stretched over the spigot, meets outer spigot surface 18 approximately half-way between the planes of gasket surfaces 54, 58. The amount by which the gaskets are stretched (i.e., the manufactured diameter of the gasket relative to the spigot diameter over which the gasket is placed) is largely a matter of choice, within the limits dictated by the materials used and desired characteristics of the joint. The gaskets of the present invention may be stretched to the same degree as conventional gaskets, for example, on the order of 10 to 30%, other considerations being equal. After being stretched over the spigot the natural tendency of the resilient gasket material to return to its original, smaller diameter will exert an inward, radial pressure on spigot surface 22 and provide a resistance against axial movement, and hence dislodgement, of the gasket.

Figure 6:
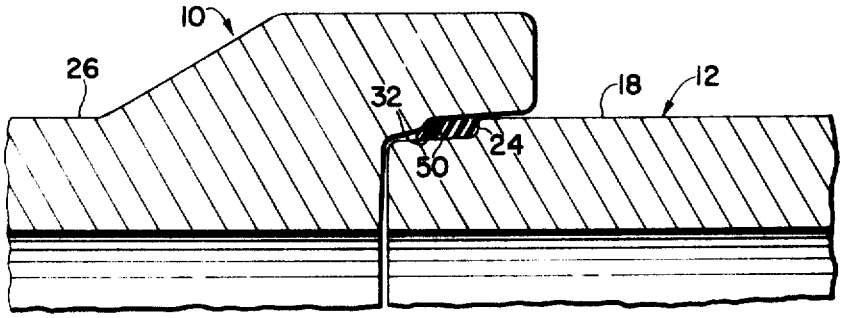
FIG. 6 shows the pipe sections joined with the gasket compressed therebetween to form the joint of the invention.

FIG. 6 illustrates the cross section of the joint after the bell end of pipe section 10 has been forced over the gasket. The gasket is compressed by somewhat less than 50% of its stretched height since the internal diameter of surface 28 of the bell end is slightly larger than the diameter of outer surface 18 of the spigot end. Although FIG. 6 shows the cross section of the joint formed with gasket 50, a similar cross sectional configuration results when gasket 38 is compressed in a like manner and therefore is not shown.

Figure 8:
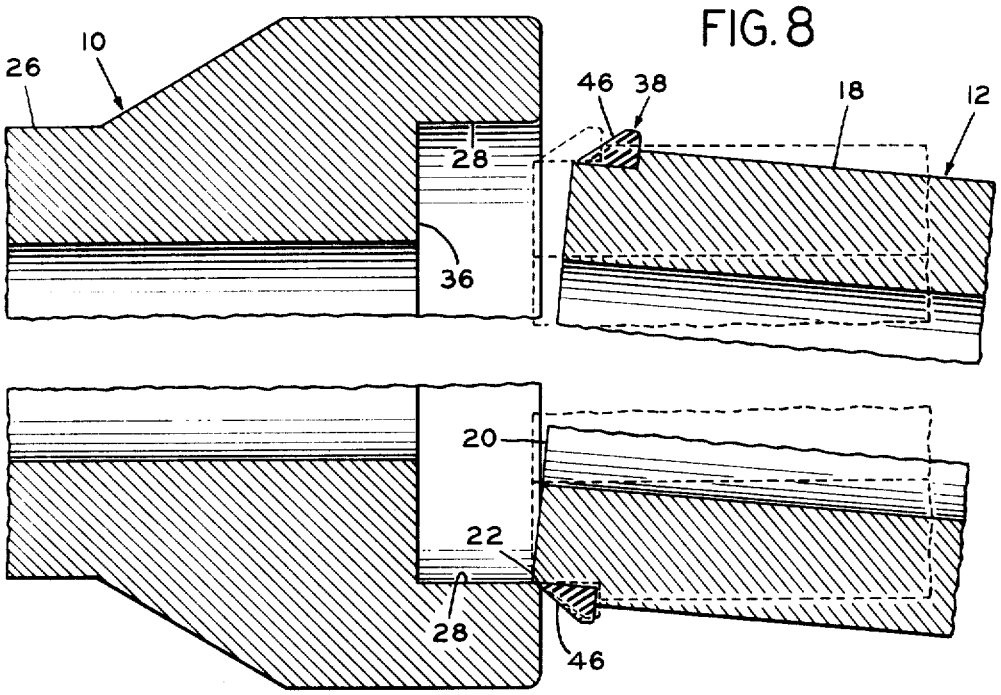
FIG. 8 is a side elevational view, in axial cross section, showing opposite sides of the joint, with the center portion removed, as the spigot is initially inserted.
Figure 9:
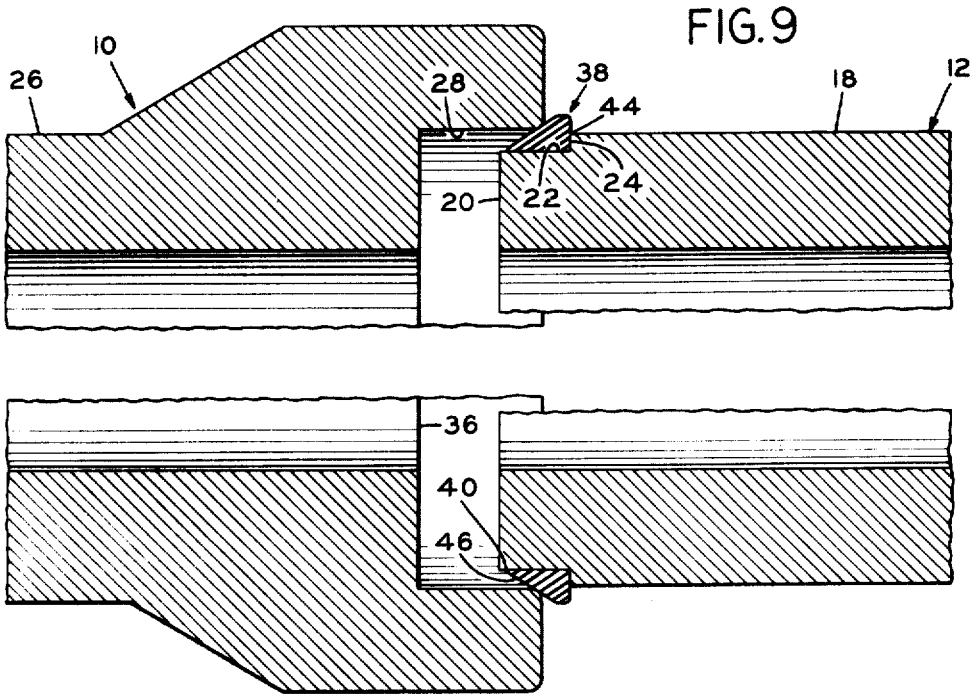
FIG. 9 is a side elevational view, similar to FIG. 8, but showing the joint as the spigot is pushed into the bell.

Referring to FIGS. 8 and 9, the joint of the instant invention can be assembled by positioning the leading end of spigot surface 22 of pipe section 12 on the leading edge of bell surface 28 of pipe section 10, the bell end of pipe section 12, i.e., the end remote from the spigot end, is then raised, or elevated. The spigot end of pipe section 12 pivots on the leading edge of the bell of pipe section 10, and pipe section 12 pivots from the full line to the phantom line position in FIG. 8. The spigot end of pipe section 12 is then pushed into the bell end of pipe section 10.

As the spigot end of pipe section 12 is pushed into the bell end of pipe section 10, inclined surface 46, 56, at toe portion 40, 52, of the gaskets of FIGS. 2 and 3, respectively, come into sliding contact with the leading end of bell surface 28, and the inclined surface 46, 56 of the gasket 38, 50 acts as an inclined plane, or wedge, raising or centering the spigot end of pipe section 12 in the bell end of pipe section 10. As the spigot is pushed further into the bell, the inclined surface, where it is in contact with the leading end of bell surface 28 continues to raise, or center, the spigot in the bell until gasket 38, 50 is in contact with the outer edge of bell surface 28 around the full circumference of the gasket and the bell. As the spigot is then moved further into the bell, gasket 38, 50, is compressed, and deformed, forming a liquid tight seal between the spigot and the bell. Bearing surface 24, in contact with surface 44, 60 of gasket 38, 50, respectively, holds the gasket in place on the spigot and, together with tension in the stretched gasket, prevents the gasket from moving axially on pipe section 12 as the spigot is inserted, centered, and pushed into the bell of pipe section 10.

It is obvious, because of the limited clearances between the bell and the spigot, that the degree of possible mis-alignment between pipe sections 10, 12, when the joint is assembled, is limited. Within the limits of these clearances, however, it is not necessary, before assembling the joint of the instant invention, to align the axes of pipe sections 10, 12, or to center the spigot end of pipe section 12 in the bell end of pipe section 10. Centering of the spigot in the bell is accomplished by the interengagement of inclined surface 46, 56 of gasket 38, 50, with the leading edge of bell surface 28. The spigot end of pipe section 12 may be inserted, and pushed into the bell of pipe 10 with the axes of pipe sections 10, 12 misaligned. When so assembled, the joint will be properly made-up and form a liquid tight seal between the bell and spigot. This is a particular advantage in the instant invention because, when being laid in a trench following the contour of the ground or a change in direction, the pipe can be laid without widening of the trench.

With the pipes joined as shown in FIG. 6, gasket 38, 50 exerts a sufficient pressure to provide an effective seal at test pressure as high as 600 p.s.i. The joint is also effective, of course, in low pressure applications and seals the joint against leakage into, as well as out of, the joint pipes.

In the preferred configuration of gaskets 38 and 50 the wedge angle, i.e., the angle between surfaces 42 and 46 in the case of gasket 38, and the ankle between surfaces 54 and 56 in the case of gasket 50, is between 30° and 45°. With this configuration the cross-sectional area of the gasket is as much as 40%–45% greater than that of a conventional O-ring gasket having the same stretched height. Hence, a greater mass of the gasket material is deflected, resulting in a greater compressing force and better sealing, when the pipe sections are joined according to the present invention. In addition, a greater radial holding force results when the wedge-shape gasket is stretched to the same degree in being placed on the spigot as an O-ring having an equivalent stretched height. Combining these two characteristics with the seating of the gasket against the bearing surface of the spigot and the relative heights of the stretched gasket and spigot shoulder, a superior seal is achieved while the chance of dislodgement is greatly reduced. Furthermore, it is evident that a greater area of the pipe joint surfaces are sealed by the gasket of the present invention than, for example, by an O-ring gasket of equivalent height. This offers an additional advantage in the sealing qualities of the gasket.

It is noted that the stable condition of the gasket when placed on the spigot permits closing the distance from the spigot face portion 20 without accidental dislodgement of the gasket during placement or joining, thereby permitting a shorter joint depth or pipe overlap due to the ease and assurance of a properly placed gasket. Obviously, a shorter joint depth results in a greater laid length of pipe for the same overall manufactured length, thus achieving a saving in the cost of the pipe required for any given laid length.

Figure 7:
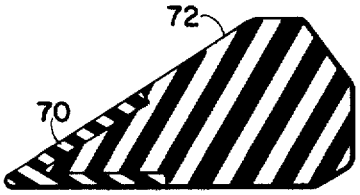
FIG. 7 is a cross section of a gasket such as that shown in FIG. 3 with a further modification.

The desired hardness of the gasket depends, to some extent on, the pipe material which is used. For example, Shore A durometer hardness of from 35 to 65 could be used. As a further refinement of the invention, it is proposed that a wedge-shaped gasket of two different durometer hardnesses be used. An example of such a gasket is shown in cross section in FIG. 7, wherein the cross-sectional configuration is the same as that of the FIG. 3 gasket. To portion 70 is formed of a material having a significantly higher durometer hardness than the remaining portion 72. With larger and heavier pipe, a hard toe portion would be more effective in centering of the pipe sections and also provide more restraint against dislodgement of the gasket during joining, while a softer bead at the end opposite the toe portion would provide the necessary sealing pressures.

It may readily be seen from the foregoing description that the bell and spigot pipe joint formed with the improved gasket configuration provides many advantages. The gasket as well as the pipe and configurations are simple and economical to manufacture. The pipe sections may be joined with very little chance of dislodging the gasket. A superior seal is achieved due to the greater mass and radial holding force of the gasket. Centering of the pipe is simplified to allow shorter joint depths, thereby achieving further manufacturing economies.

The joint of the instant invention is adaptable for use in a wide variety of pipe sizes. In adapting the joint to a particular pipe size, certain precautions are suggested. As has been noted above, the stretched radial height of the gasket should be about twice the height of the spigot bearing surface 24 before the joint is assembled. Furthermore, the clearance between the outer diameter of the surface 18 of the spigot and the diameter of bell surface 28 should be such that, with the joint assembled and surface 18 in contact with surface 28 at one side of the joint, the gasket between spigot surface 22 and bell surface 28 at the opposite side of the joint is at least 15% deflected or compressed. This is important because, although the gasket centers the spigot in the bell as the joint is assembled, bell pipe 10 and spigot pipe 18 may later be under different external loads and the spigot of pipe 18 may be laterally off-set in the bell of pipe 10 so that surfaces 18 and 28 are in contact with each other at one side of the joint. The deflection or compression of the gasket of not substantially less than 15%, assures a liquid tight joint.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A push on pipe joint for two adjoining and substantially coaxial sections of cylindrical pipe with a gasket therebetween for aligning said sections of pipe as the end of one of said pipe sections is pushed into the end of the other of said pipe sections and for effecting a substantially liquid tight, resilient seal, therebetween for sealing said joint against leakage into and out of said pipe, said joint comprising, in combination:

(a) a spigot end on one of said pipe sections having a stepped bearing surface around the full periphery thereof;

(b) said bearing surface lying in a plane substantially normal to the major axis of said one pipe section;

(c) a bell end on the other of said pipe sections having an opening of larger diameter than that of said spigot end at the outermost edge of said bearing surface, said opening extending into said bell and forming a substantially cylindrical surface at the outer end of said bell;

(d) a resilient sealing gasket mounted on said spigot end with a first radial surface seated against said bearing surface and extending radially outward thereon, said gasket being stretched over said spigot as said gasket is mounted thereon so that the said gasket is stretched not substantially less than 10% and not substantially more than 30%;

(e) a second surface on said gasket disposed at substantially 90° to said first surface and seated on a circumferential surface of said spigot end abuting the innermost edge of said bearing surface, said second surface being longer than said first surface, said bearing surface on said spigot being not substantially less than one-half of the radial height of said gasket stretched over said spigot before said spigot, with said gasket stretched thereon, is inserted into said bell, said gasket being between said bearing surface on said spigot and the end of said spigot and being radially compressed between said spigot and said cylindrical surface of said bell by not substantially less than 15% and not substantially more than 50% when said spigot, with said gasket stretched thereon, is forced into said bell; and (f) a third surface on said gasket adjoining said second surface and disposed at an acute angle to said second surface forming a wedge shaped toe portion on said gasket at a point on said gasket remote from said bearing surface and adjacent said circumferential surface of said spigot, said acute angle forming said wedge shaped toe portion being not substantially smaller than 30° and not substantially greater than 45°, said wedge shaped to portion where said third surface joins said second surface engaging the edge of said opening of larger diameter in said bell to substantially center said spigot in said bell, as said spigot, is inserted into said bell, before said gasket is compressed between said spigot and said cylindrical surface of said bell.

2. A pipe joint as recited in claim 1 wherein said gasket includes a fourth surface substantially parallel with said second surface.

3. A pipe joint as recited in claim 2 wherein said fourth surface lies in a plane spaced from the plane of said second surface, when said gasket is mounted on said spigot end, by a distance which is substantially twice the height of said stepped bearing surface.

4. A pipe joint as recited in claim 3 wherein said gasket includes a fifth surface, joining said first and fourth surfaces, and a sixth surface, joining said first and second surfaces.

5. A pipe joint as recited in claim 4 wherein, in cross section of said gasket, said fourth surface and said sixth surface is substantially parallel with said third surface, and a line bisecting the angle between said second and third surfaces also bisects the angle between said first and fifth surfaces, whereby said gasket is substantially symmetrical about said line.

6. A pipe joint as recited in claim 5 where said gasket is formed of a resilient material having a Shore A durometer hardness of from 35 to 65 the hardness in the portion where said second and third surfaces meet being greater than in the portion including said first, fourth, fifth and sixth surfaces.

*7. A push on pipe joint for two adjoining and substantially coaxial sections of cylindrical pipe with a gasket there between for aligning said sections of pipe as the end of one of said pipe sections is pushed into the end of the other of said pipe sections and for effecting a substantially liquid tight, resilient seal, therebetween for sealing said joint against leakage into and out of said pipe, said joint comprising, in combination:*

*(a) a spigot end on one of said pipe sections having a stepped bearing surface around the full periphery thereof;*

*(b) said bearing surface lying in a plane substantially normal to the major axis of said one pipe section;*

*(c) a bell end on the other of said pipe sections having an opening of larger diameter than that of said spigot end at the outermost edge of said bearing surface, said opening extending into said bell and forming a substantially cylindrical surface at the outer end of said bell;*

*(d) a resilient sealing gasket mounted on said spigot end with a first radial surface seated against said bearing surface and extending radially outward thereon, said gasket being stretched over said spigot as said gasket is mounted thereon;*

*(e) a second surface on said gasket disposed at substantially 90° to said first surface and seated on a circumferential surface of said spigot end abutting the innermost edge of said bearing surface, said second surface being longer than said first surface, said bearing surface on said spigot being not substantially less than one-half of the radial height of said gasket stretched over said spigot before said spigot, with said basket stretched thereon, is inserted into said bell, said gasket being between said bearing surface on said spigot and the end of said spigot and being radially compressed between said spigot and said cylindrical surface of said bell by not substantially less than 15% and not substantially more than 50% when said spigot, with said gasket stretched thereon, is forced into said bell; and*

*(f) a third surface on said gasket adjoining said second surface and disposed at an acute angle to said second surface forming a wedge shaped toe portion on said gasket at a point on said gasket remote from said bearing surface and adjacent said circumferential surface of said spigot, said acute angle forming said wedge shaped toe portion being not substantially smaller than 30° and not substantially greater than 45° said wedge shaped toe portion where said third surface joins said second surface engaging the edge of said opening of larger diameter in said bell to substantially center said spigot in said bell, as said spigot is inserted into said bell, before said gasket is compressed between said spigot and said cylindrical surface of said bell.*

*8. A pipe joint as recited in claim 7 wherein said gasket includes a fourth surface substantially parallel with said second surface.*

*9. A pipe joint as recited in claim 8 wherein said fourth surface lies in a plane spaced from the plane of said second surface, when said gasket is mounted on said spigot end, by a distance which is substantially twice the height of said stepped bearing surface.*

*10. A pipe joint as recited in claim 9 wherein said gasket includes a fifth surface, joining said first and fourth surfaces, and a sixth surface, joining said first and second surfaces.*

*11. A pipe joint as recited in claim 10 wherein, in cross section of said gasket, said fourth surface and said sixth surface is substantially parallel with said third surface, and a line bisecting the angle between said second and third surfaces also bisects the angle between said first and fifth surfaces, whereby said gasket is substantially symmetrical about said line.*

*12. A pipe joint as recited in claim 11 where said gasket is formed of a resilient material having a Shore A durometer hardness of from 35 to 65 the hardness in the portion where said second and third surfaces meet being greater than in the portion including said first, fourth, fifth and sixth surfaces.*

References Cited

The following references, cited by the Examiner, are of record in the patented file of this patent or the original patent.

UNITED STATES PATENTS

| | | | |
|---|---|---|---|
| 3,185,490 | 5/1965 | Gagne | 277—170 |
| 3,298,697 | 1/1967 | Ohnstad | 277—11 |
| 2,882,073 | 4/1959 | James | 277—207 |

FOREIGN PATENTS

| | | | |
|---|---|---|---|
| 392,287 | 5/1933 | Great Britain | 277—101 |
| 456,072 | 11/1936 | Great Britain | 277—207 A |

ROBERT G. NILSON, Primary Examiner